US012005564B2

(12) United States Patent
Garness et al.

(10) Patent No.: US 12,005,564 B2
(45) Date of Patent: Jun. 11, 2024

(54) HYBRID CLAMP AND CLAMPING SAWHORSE

(71) Applicant: JS Products, Inc., Las Vegas, NV (US)

(72) Inventors: Richard Garness, Las Vegas, NV (US); James Stobar, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 0 days.

(21) Appl. No.: 17/507,367

(22) Filed: Oct. 21, 2021

(65) Prior Publication Data

US 2022/0126436 A1 Apr. 28, 2022

Related U.S. Application Data

(60) Provisional application No. 63/104,489, filed on Oct. 22, 2020.

(51) Int. Cl.
*B25H 1/06* (2006.01)

(52) U.S. Cl.
CPC ...................................... *B25H 1/06* (2013.01)

(58) Field of Classification Search
CPC ........... B25B 5/003; B25B 5/006; B25B 5/02; B25B 5/068; B25B 5/166; B25B 5/102; B25H 1/06; B25H 1/08; B25H 1/10
See application file for complete search history.

(56) References Cited

U.S. PATENT DOCUMENTS 4,498,662 A * 2/1985 Halter ...................... B25H 1/10 269/283
4,828,241 A * 5/1989 Yang ....................... B25B 5/166 269/45
4,949,944 A * 8/1990 Groff, Sr. ............. B25H 1/0007 269/45
5,105,862 A 4/1992 Skinner et al.
5,553,838 A * 9/1996 Lee ......................... B25B 5/108 269/93
5,568,915 A * 10/1996 Raymond ............... B25B 5/166 269/166
5,836,365 A 11/1998 Derecktor
5,960,904 A 10/1999 Ullmann
(Continued)

FOREIGN PATENT DOCUMENTS

CN 301699077 10/2011
CN 302685948 12/2013
(Continued)

OTHER PUBLICATIONS

Machine translation of WO-9324283-A1 (Year: 1993).*
Notice of Allowance and Search Report for ROC (Taiwan) Patent Application No. 110302068, dated Nov. 12, 2021, 5 pages.

*Primary Examiner* — Lee D Wilson
*Assistant Examiner* — Robert F Neibaur
(74) *Attorney, Agent, or Firm* — Weide & Miller, Ltd.

(57) ABSTRACT

A hybrid clamp is configurable as a bar clamp or a dog clamp, where first and second clamp members may be associated with a clamp bar or may be separated and connected to other supports for use as dog clamps. A clamping sawhorse is configured to mount the hybrid clamp for use as a bar clamp or as a dog clamp in conjunction with the sawhorse, such as including apertures for accepting either the clamp bar or mounting portions of the first and second clamps.

14 Claims, 12 Drawing Sheets

(56) References Cited

U.S. PATENT DOCUMENTS

| | | | | |
|---|---|---|---|---|
| 6,079,703 | A * | 6/2000 | Chavez, Jr. | B25H 1/16 269/166 |
| 6,283,250 | B1 * | 9/2001 | Asher | B25H 1/10 182/225 |
| D471,287 | S | 3/2003 | Sommerville et al. | |
| 6,681,895 | B2 | 1/2004 | Virtue | |
| D489,738 | S | 5/2004 | Radermacher | |
| 6,745,804 | B2 | 6/2004 | Welsh et al. | |
| 6,957,808 | B2 * | 10/2005 | Varzino | B25B 1/22 269/95 |
| 7,185,738 | B1 | 3/2007 | Clepper | |
| 7,210,510 | B2 | 5/2007 | Berclay deTolly | |
| 7,222,648 | B2 | 5/2007 | Liu et al. | |
| D549,749 | S | 8/2007 | Francis et al. | |
| 7,418,907 | B2 * | 9/2008 | Haimoff | B25H 1/12 108/115 |
| D584,421 | S | 1/2009 | Wise | |
| 7,481,254 | B2 | 1/2009 | Welsh et al. | |
| D623,672 | S | 9/2010 | Francis et al. | |
| 7,798,478 | B2 * | 9/2010 | Janson | B25B 5/102 269/166 |
| 8,505,892 | B2 * | 8/2013 | Seidel | B25B 5/10 269/46 |
| 8,528,870 | B2 | 9/2013 | Liu et al. | |
| 8,684,052 | B2 | 4/2014 | Breitenbach | |
| 9,221,168 | B2 | 12/2015 | Boyd | |
| 9,302,288 | B2 | 4/2016 | Waterston | |
| 9,421,672 | B2 * | 8/2016 | Rowlay | B25B 5/006 |
| 9,557,000 | B2 | 1/2017 | Chang | |
| 9,776,307 | B2 * | 10/2017 | Siegmund | B25B 5/102 |
| D842,015 | S | 3/2019 | Strempke et al. | |
| 10,252,410 | B2 | 4/2019 | Luis y Prado | |
| D872,877 | S | 1/2020 | Hanlon | |
| D882,824 | S | 4/2020 | Hanlon | |
| D899,629 | S | 10/2020 | Hanlon | |
| 10,864,625 | B2 | 12/2020 | Hanlon | |
| 11,110,559 | B2 * | 9/2021 | Cross | B25B 1/103 |
| 2010/0288585 | A1 | 11/2010 | Katz et al. | |

FOREIGN PATENT DOCUMENTS

| | | | |
|---|---|---|---|
| CN | 303660132 | 5/2016 | |
| CN | 306111150 | 10/2020 | |
| WO | WO-9324283 A1 * | 12/1993 | B25H 1/06 |

* cited by examiner

HYBRID CLAMP AND CLAMPING SAWHORSE

RELATED APPLICATION DATA

The present application claims priority to U.S. Provisional Application Ser. No. 63/104,489, filed Oct. 22, 2020, which application is incorporated herein in its entirety by reference.

FIELD OF THE INVENTION

The present invention relates to workpiece holders and supports.

BACKGROUND OF THE INVENTION

A variety of work supports, such as for supporting items being worked upon with tools, are known. One well-known type of work support is a sawhorse. Sawhorses usually have a main beam that is supported by two pairs of legs. The legs are usually collapsible, allowing the sawhorse to be stored in a generally vertical position. One common design of a sawhorse is made of 2×4 lumber, where one piece of 2×4 lumber forms the main beam and other 2×4 pieces form downwardly extending pairs of legs.

These conventional sawhorses provide very basic supporting functionality, such as enabling a user to support a sheet of plywood or long pieces of lumber between two sawhorses. However, the sawhorses have various limitations. For example, they are often heavy and difficult to move, even when they can be collapsed. Also, workpieces that are placed on these sawhorses often move or fall off.

Work supports or holders also include clamps. A variety of different clamps are known, each generally having a particular configuration for a particular purpose. This requires the user to have different claims for different uses, including when supporting workpieces in different settings.

Improved work supports and holders which overcome these and other problems are desired.

SUMMARY OF THE INVENTION

Aspects of the invention comprise a hybrid clamp and a clamping sawhorse, and methods of using the same. In one embodiment, a hybrid clamp is configurable as a bar clamp or a dog clamp. The clamping sawhorse is configured to mount the hybrid clamp for use as a bar clamp or as a dog clamp in conjunction with the sawhorse.

One embodiment of a hybrid clamp comprises a clamp bar, a first clamp body having a mounting portion and at least one slot for receiving the clamp bar, a second clamping body having a mounting portion and at least one slot for receiving the clamp bar, a first clamp member connected to the first clamp body, the first clamp member comprising at least one adjustable member, a second clamp member connected to the second clamp body, the second clamp member comprising a stop, whereby the first and second clamp bodies may be movably located on the clamp bar and the associated first and second clamp members may be used to clamp an element therebetween, and whereby the first and second clamp bodies may be connected to a support other than the clamp bar by location of the mounting portion of the first or second clamp body into a mating aperture in the support.

In one embodiment, the clamp bar is elongate and has a rectangular cross-section. The mounting portions of the first and second clamp bodies may be generally cylindrical in shape, such as for insertion into a corresponding aperture or bore of a support member. The adjustable member may comprise a threaded rod, having a foot at one end and a handle at an opposing end.

The hybrid clamp may include at least one adjustable stop locatable on the clamp bar.

Another embodiment of the invention comprises a clamping sawhorse comprising a head, at least a first leg and at least a second leg extending downwardly from the head and supporting the head in a raised position, at least one bar mount for receiving a clamp bar of a hybrid clamp, and at least one hybrid clamp mount, the at least one hybrid clamp mount comprising an aperture in the head which is configured to accept either the clamp bar or a portion of the first clamp body or the second clamp body.

The at least one bar mount may comprise one or more clips for removably receiving the clamp bar. The at least one aperture may extends into a top of the head or extend generally transversely into a side of the head. When the first and second clamp bodies comprises a cylindrical portion the aperture may comprise a cylindrical bore for receiving the cylindrical portion. In other embodiments, the aperture may include a slot which intersects the cylindrical portion, the slot configured to receive the clamp bar.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a hybrid clamp. Other embodiments of the invention comprise a clamping sawhorse or sawhorse with one or more clamps, such as a hybrid clamp of the invention.

Hybrid Clamp

Figure 1:
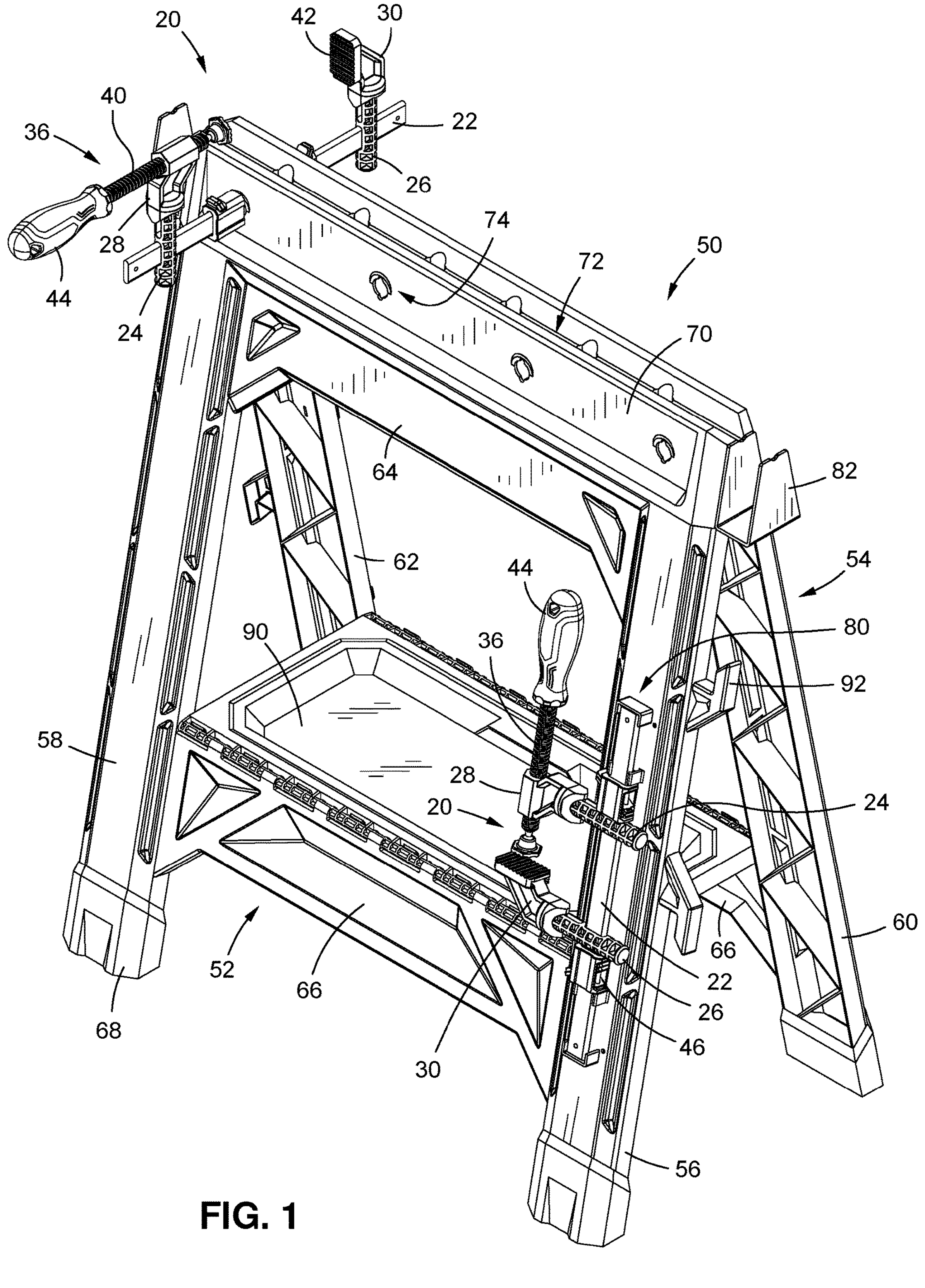
FIG. 1 is a perspective view of a clamping sawhorse with a hybrid clamp in accordance with an embodiment of the invention.
Figure 8:
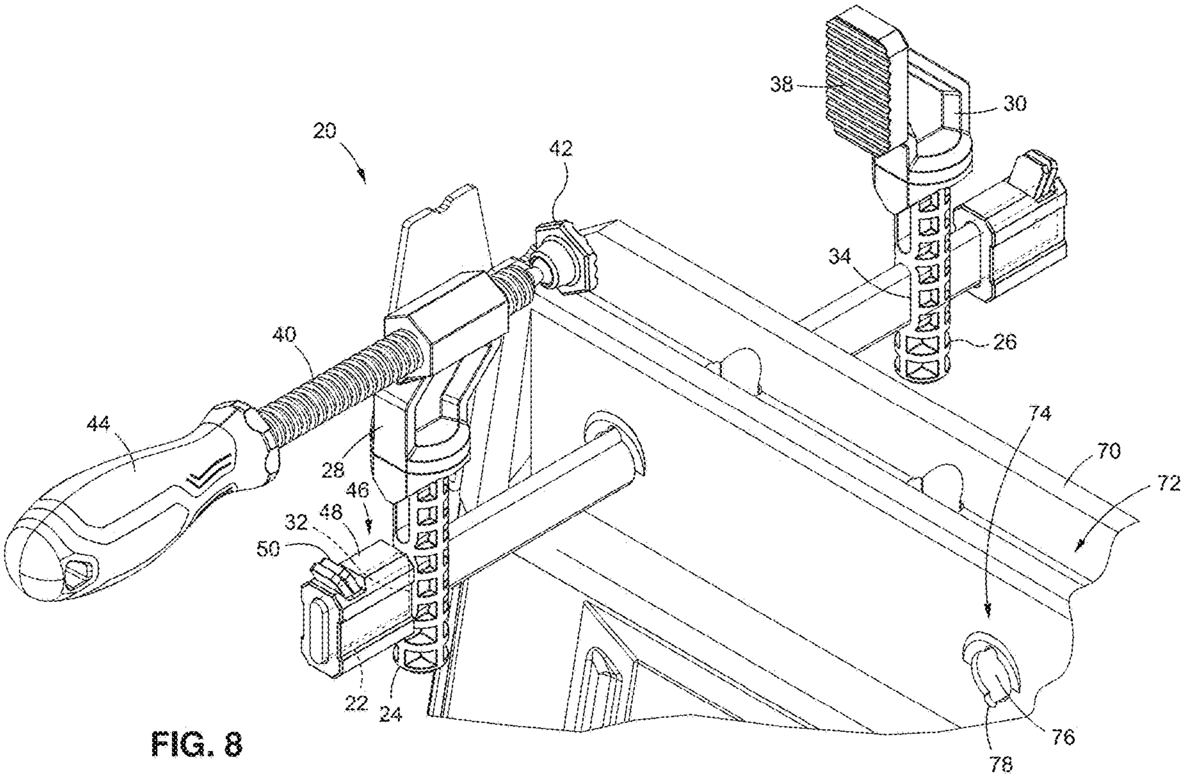
FIG. 8 is an enlarged view of hybrid clamp of the invention connected to the clamping sawhorse illustrated in FIG. 1 in a first position.
Figure 9:
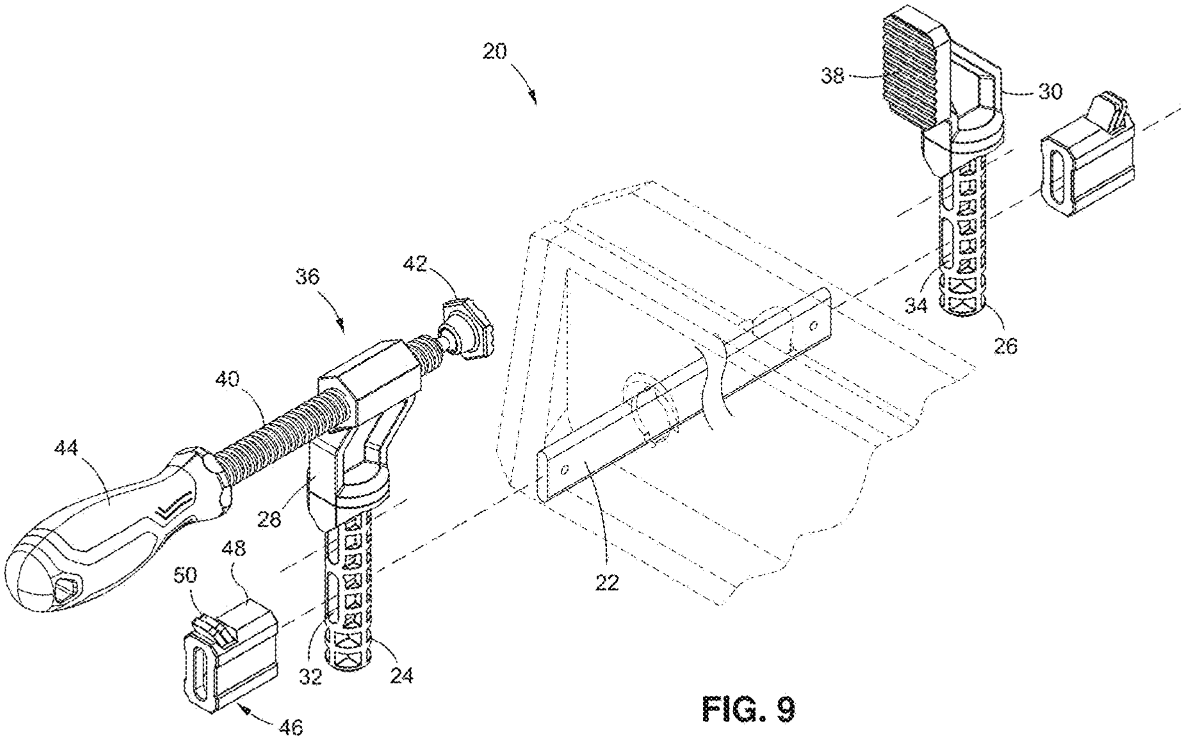
FIG. 9 is an exploded view of the hybrid clamp illustrated in FIG. 8.

As best illustrated in FIGS. 1, 8 and 9, a hybrid clamp 20 comprises a clamp bar or support 22, a first clamp body 24, a second clamp body 26, a first clamp or clamp member 28, and a second clamp or clamp member 30. In one embodiment, the clamp bar 22 may comprise an elongate (in relation to its width and depth) bar, such as of rectangular (in cross-section) metal bar stock. The clamp bar 22 may have a front, a back, a first end, a second end and a pair of sides.

The first clamp body 24 may comprise a support for the first clamp member 28, preferably where the first clamp body 24 is both configured to be movably mounted on the clamp bar 22, such as for sliding movement thereon, and for independent mounting to another support, such a mounting hole of another body. In one embodiment, the first clamp body 24 comprises or defines a mounting portion, such as a cylindrical mount, for placement in such an associated mounting aperture, hole or bore, as described below. The second clamp body 26 may comprise a support for the second clamp member 30, preferably where the second clamp body 26 is both configured to be movably mounted on the clamp bar 22 for sliding movement thereon, and for independent mounting to another support (such as again, a cylindrical mounting portion for placement in an associated mounting hole).

In one embodiment, the first clamp body 24 defines a slot 32 for receiving the clamp bar 22. When the clamp bar 22 is generally rectangular, so is the slot 32. As illustrated, the slot 32 preferably extends through the first clamp body 24 generally perpendicular to a line that extends longitudinally through the cylindrical body thereof. The second clamp body 26 preferably also defines a similar slot 34. Of course, the clamp bodies 24,26 might have other shapes, such as for mounting in holes having other cross-sectional shapes, etc. The clamp bodies 24,26 might also have more than one slot 32,34, such for mounting them in different locations or orientations on the clamp bar 22.

The first clamp member 28 may comprise, for example, a mount and an adjustable member 36 which is supported by the mount. As illustrated, the adjustable member 36 may comprise a threaded rod 40 which may have a foot or pad 42 at one end and a handle 44 at the other, where the threaded rod 40 extends through a threaded bore of the mount (which itself may be connected to the first clamp body 24 or comprise an extension thereof). The second clamp member 30 may comprise a mount and a stop or dog 38 (which may be fixed relative to the mount or which might be adjustable mounted thereto). Of course, the configurations of the first and second clamps or clamp members 28,30 might vary. However, one of the members is preferably position adjustable, so that a distance between a portion thereof and another object, such as an item to be clamped, can be adjusted.

As described, the hybrid clamp 20 can be used as a bar clamp where the first and second clamp bodies 24,26 are located on the bar 22. The positions of either or both of the clamp bodies 24,26 maybe adjustable along the bar 22, such as by sliding them along the bar 22 relative to the slots 32,34 therein. In one embodiment, movement of the first and second clamp bodies 24,26 (and thus the associated first and second clamp members 28,30) may be limited, such as by one or more stops 46. The stops 46 may comprise a body or housing 48 which supports a movable lock 50. The lock 50 may be a pivoting tab which has a slot therethrough for accepting the clamp bar 22 (and the housing 48 may also have an opening or slot therein for accepting the clamp bar 22), where the lock 50 may be moved between one position in which the slot therethrough is aligned with the bar 22, allowing the stop 46 to be moved along the bar, and another position (such as a tilted or offset position) in which the slot therethrough is angled relative to the bar 22 and the lock 50 binds on the bar 22. In one embodiment, the lock 50 may be biased towards its locked position, such as a by a spring or other means for biasing, and where a user may move the lock 50 to its unlocked position.

As illustrated, one or more stops 46 may be located on the bar 22 (and may be entirely removable therefrom). For example, one stop 46 might be located between a first end of the bar 22 and the first clamp body 24, an another stop 46 may be located between a second end of the bar and the second clamp body 26. In this manner, movement of the first and second clamp bodies 24,26 (and thus the associated first and second clamp members 28,30) away from one another (movement of the first clamp body 24 towards the first end of the bar 22 and movement of the second clamp body 26 towards the second end of the bar 22) may be limited or prevented (except when the stops 46 are unlocked). Movement of the first and second clamp bodies 24,26 towards and away from one another may be utilized, for example, for making "gross" clamping adjustments.

In addition, the position of the adjustable member 36 may be changed relative to the dog (such as to clamp an object between the first and second clamp members 28,30). This adjustment may provide for "fine" clamping adjustment.

Figure 11:
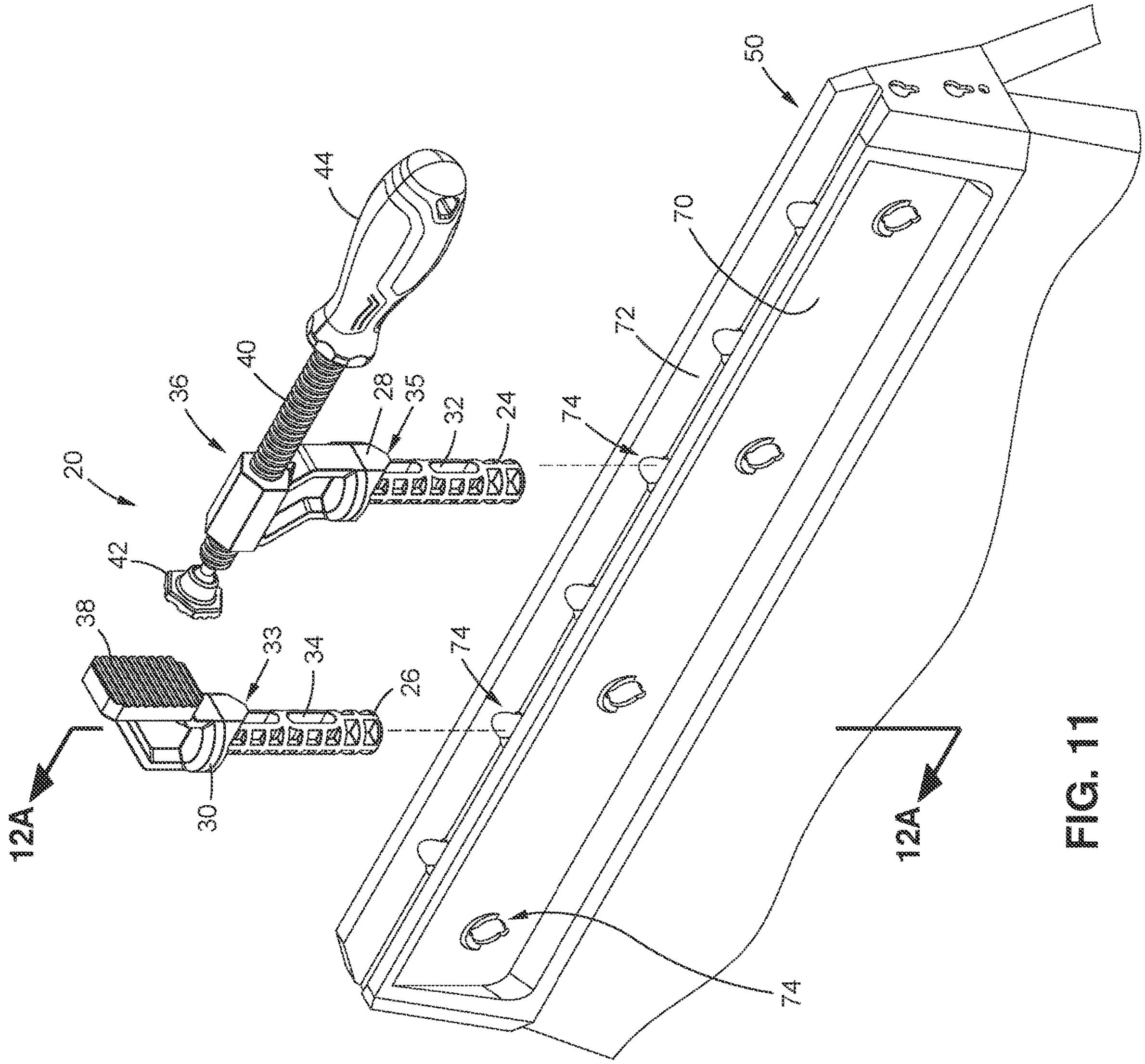
FIG. 11 illustrates a connection of a hybrid clamp of the invention connected to the clamping sawhorse illustrated in FIG. 1 in a third position.
Figure 12B:
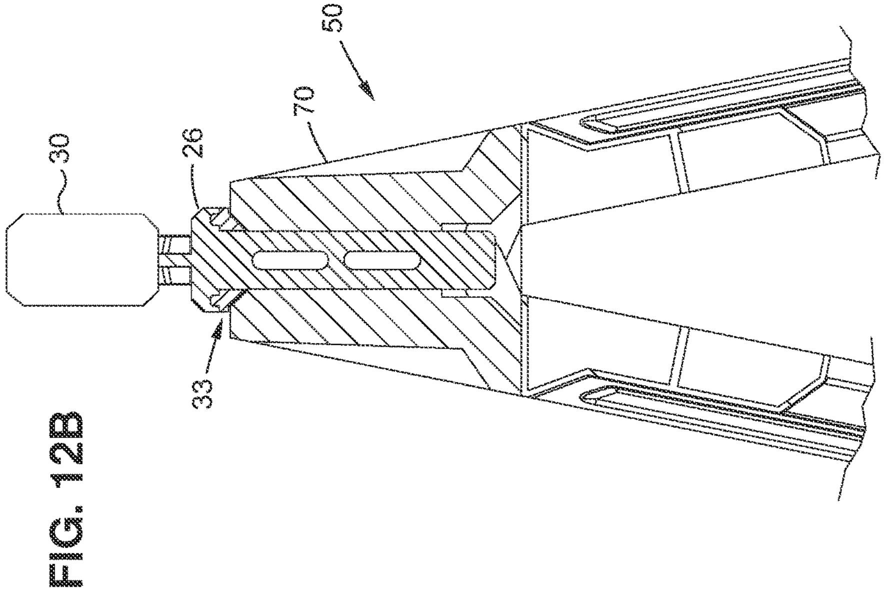
FIGS. 12A-B are cross-sections views of a portion of the hybrid clamp being engaged with the clamping sawhorse in the position illustrated in FIG. 11.
Figure 12A:
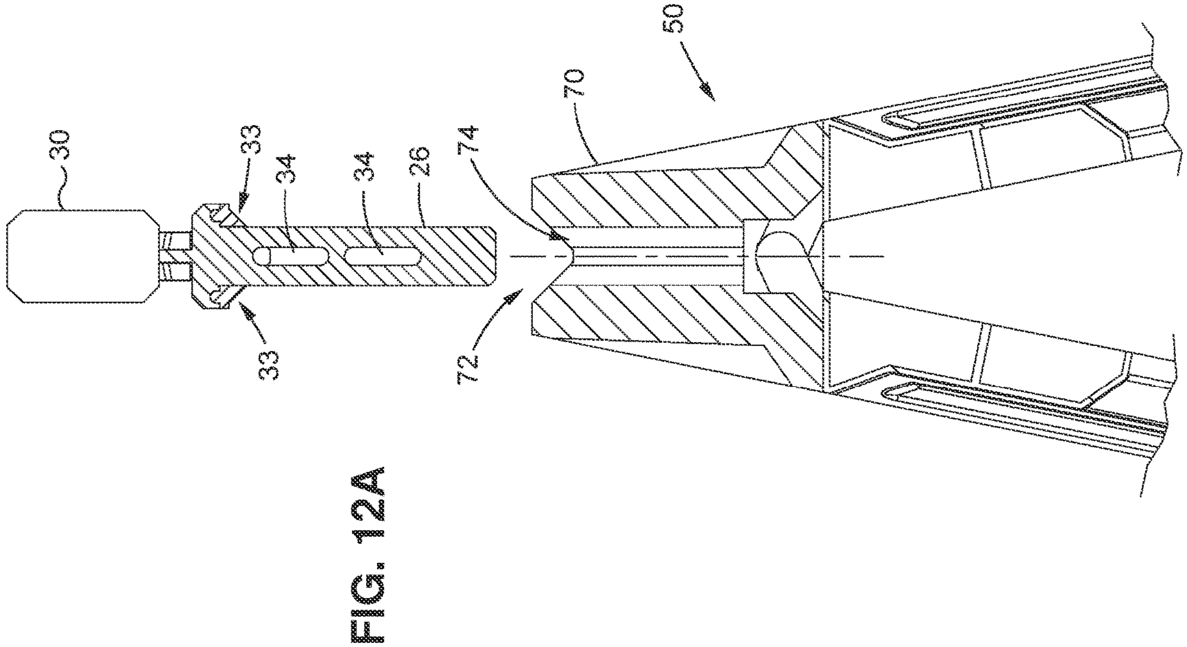

In addition, either or both of the first and second clamp members 28,30 may be used as a "dog" clamp, such as where the first clamp member 28 or the second clamp members 30 is independently mounted to another object (e.g. without the bar 22). For example, the first clamp body 24 might be mounted directly to another object, as might be the second clamp body 26. For example, as illustrated in FIGS. 11 and 12A-B, the first clamp body 24 (such as the cylindrical portion thereof) might be mounted in a bore formed in a workbench or, as described below, a special sawhorse, wherein the position of the first clamp member 28 may then be adjusted against a workpiece (without using the second clamp body 26). Likewise, the second clamp body 26 might be mounted in a similar bore, whereby the second clamp member 30 might be used as a stop or the like for a workpiece. As best illustrated in FIGS. 11 and 12A-12B, the first and second clamp members 28,30 may include at least one extension 33,35. As illustrated, the extensions 33,35 may comprise a portion that extends downwardly past a top of the cylindrical portion. As illustrated, the extensions 33,35 may be generally "V" shaped (see FIGS. 12A and 12B), and the first and second clamp members 28,30 may each include two extensions 33,35, such as located opposite one another around the cylindrical portion. As also illustrated in FIG. 11, the extension 33 is located outwardly of the outer surface of the cylindrical portion. As illustrate in FIG. 12B, the extension 33 is configured to engage a workbench or sawhorse when the clamp member is used as a dog clamp (for example, in FIG. 12B, by engaging portions of a head 70 of a sawhorse 50 adjacent a groove 72, as described in more detail below).

Clamping Sawhorse

While the hybrid clamp 20 may be used in a variety of environments and applications, in one embodiment, the hybrid clamp 20 may be used with a sawhorse, which sawhorse may be referred to as a clamping sawhorse 50 due to its inclusion of one or more mounts for at least one hybrid clamp 20.

The clamping sawhorse 50 may have various configurations, but in one embodiment has a features which enable it to support a hybrid clamp 20 and preferably has a structure designed to accommodate clamping loads.

Figure 2:
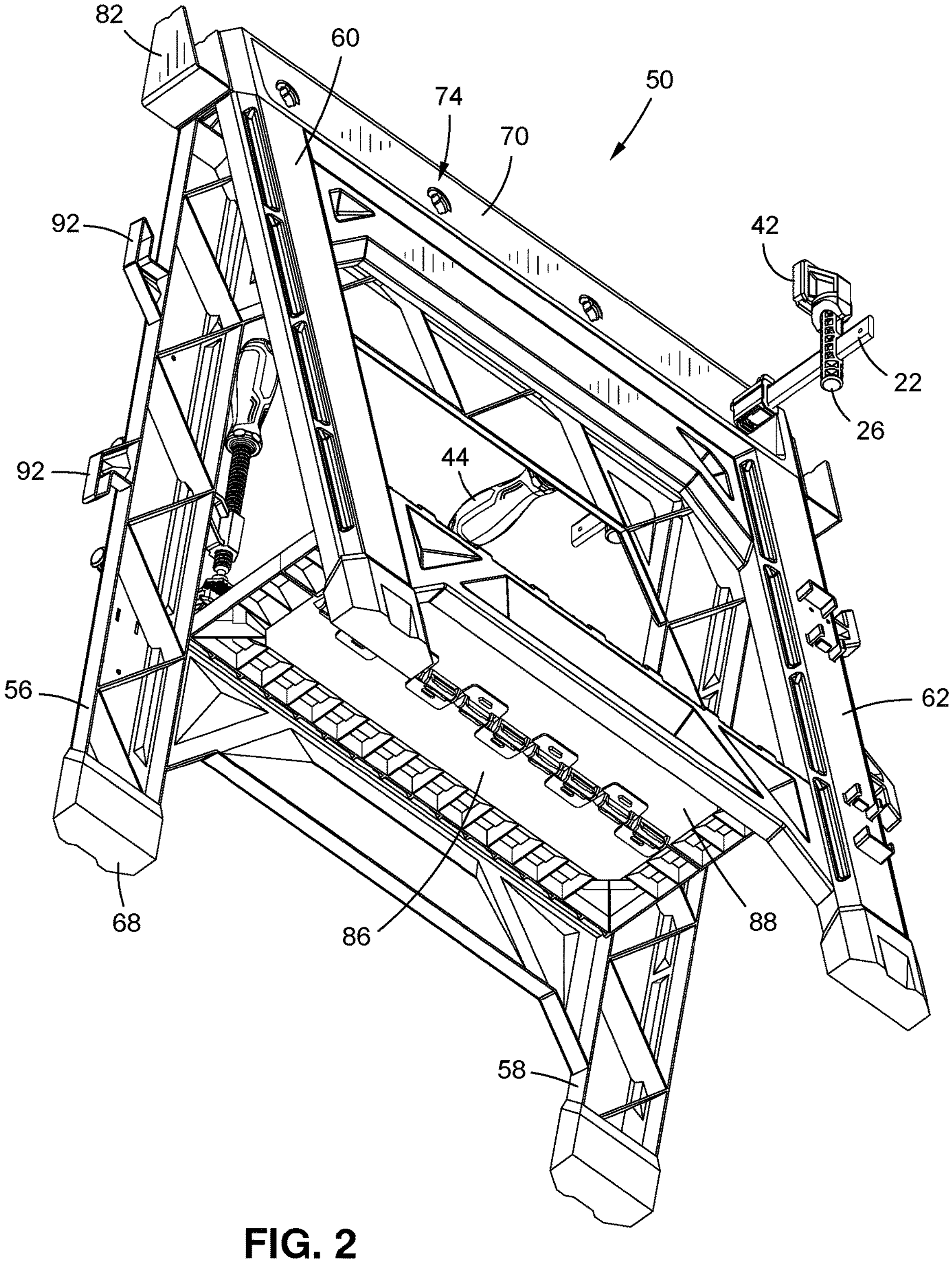
FIG. 2 is a perspective bottom view of the clamping sawhorse illustrated in FIG. 1.
Figure 5:
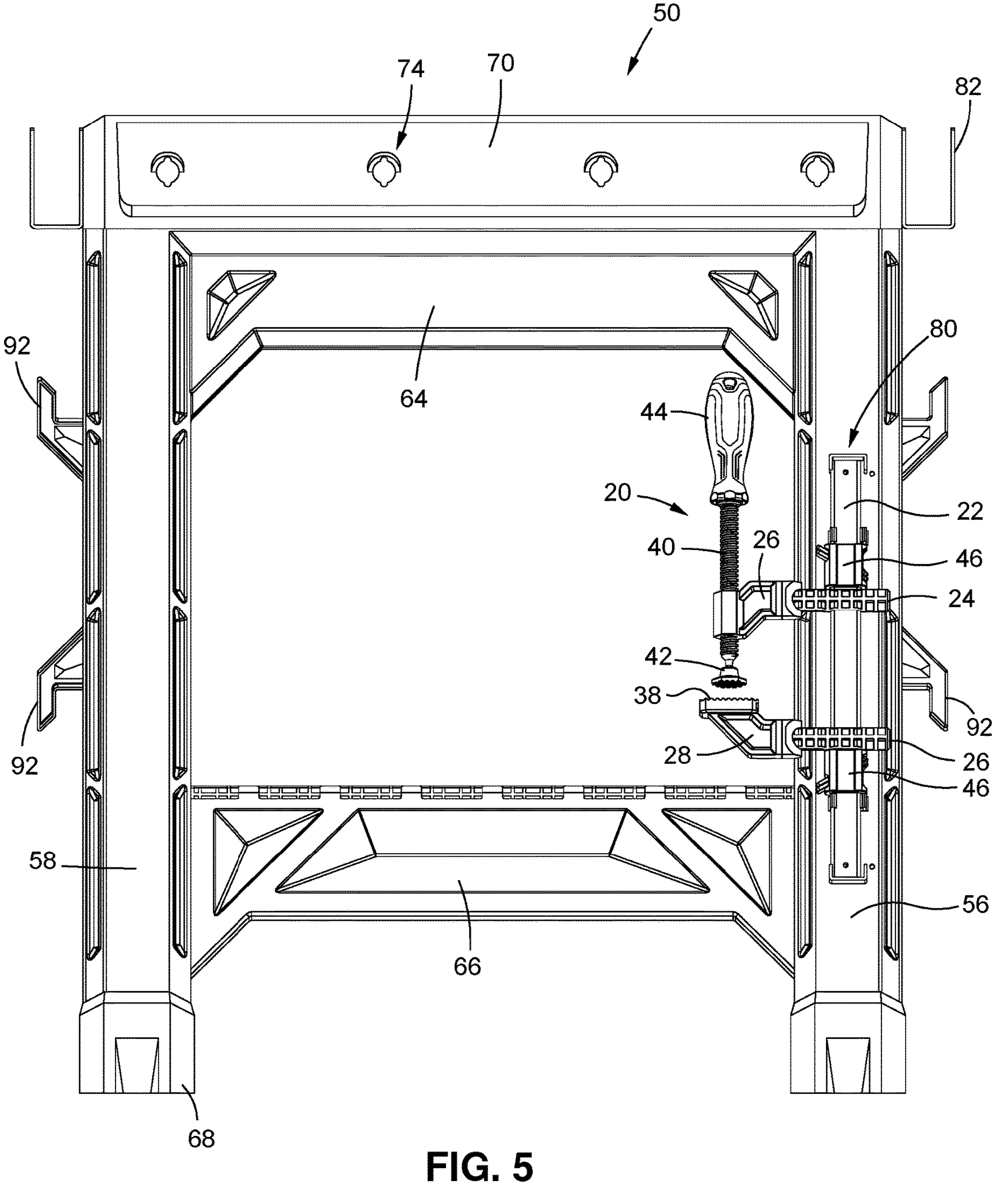
FIG. 5 is a side view of the clamping sawhorse illustrated in FIG. 1.
Figure 6A:
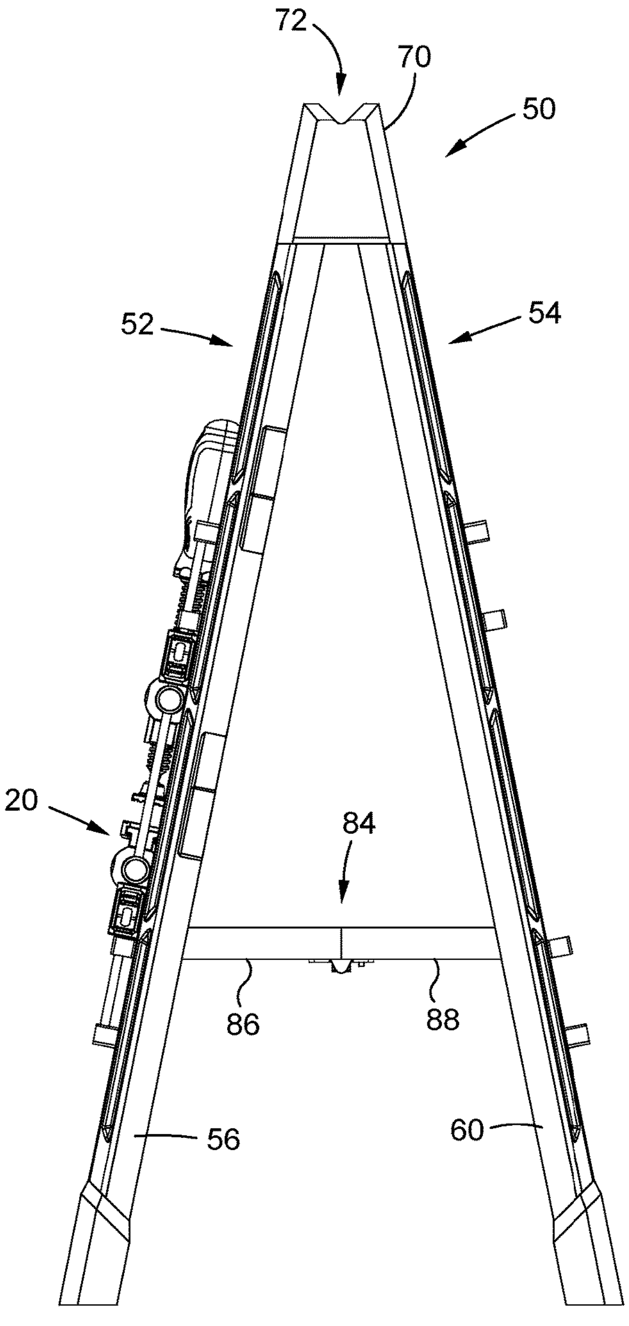
FIGS. 6A-B are end views of the clamping sawhorse of FIG. 1 shown in expanded and collapsed positions.
Figure 6B:
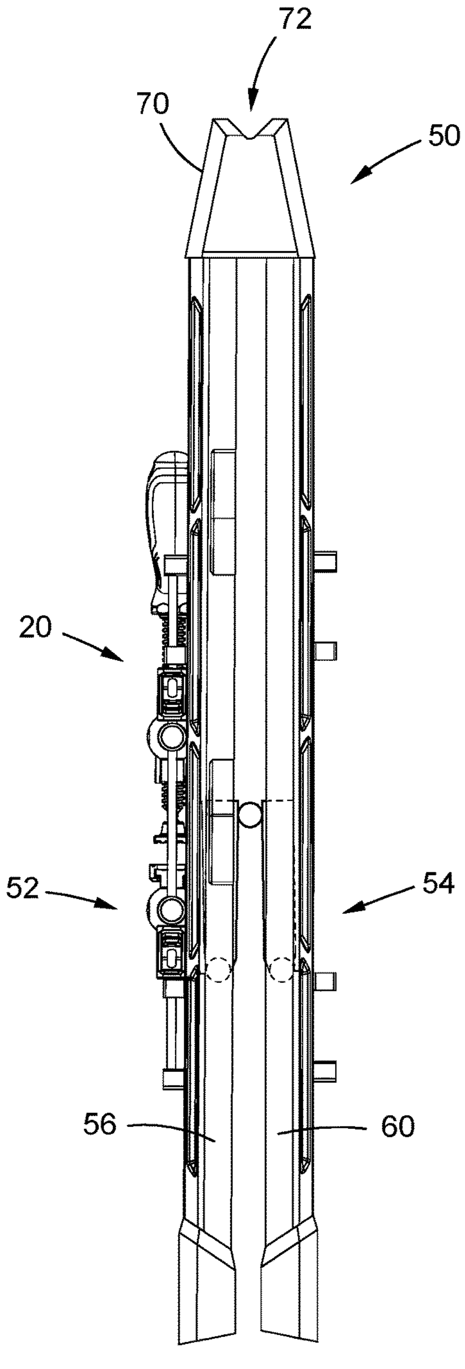

As illustrated, in FIGS. 1-2 and 5, the sawhorse 50 has a first side or support 52 and a second side or support 54. The first side 52 may define spaced first and second legs 56,58 and the second side 54 may define spaced third and fourth legs 60,62. In one embodiment, the first and second sides 52 each have a top and a bottom. The first and second sides 52,54 are movably connected, such as hingedly connected, allowing the sides 52,54 to be moved towards one another to a collapsed position such as illustrated in FIG. 6B (where the first and second sides 52,54 are generally parallel to one another) and an expanded or extended position such as illustrated in FIG. 6A (where the first and second sides 52,54 are at an angle relative to one another, where the bottom of the first and second sides 52,54 are spaced outwardly from one another). The first and second sides 52,54 might be movably connected in various manners, such as by coupling of one or more hinge members or elements (as shown) or by mounting to one or more pins or rods, or in other manners.

In one embodiment, the first side 52 and the second side 54 both have a top cross-support 64 and a bottom cross-support 68. The top cross-support 64 may be near a top of each of the first and second sides 52,54, while the bottom cross-support 66 may be near the bottom thereof. In one embodiment, each legs 56,58,60,62 defines a foot 68, such as for engaging a supporting surface.

In one embodiment, a cross-member or head 70 is located at the top of the first and second sides 52,54. The head 70 may have various configurations. In one embodiment, the head 70 has a length generally equal to a width of the first and second sides 52,54.

Figure 4A:
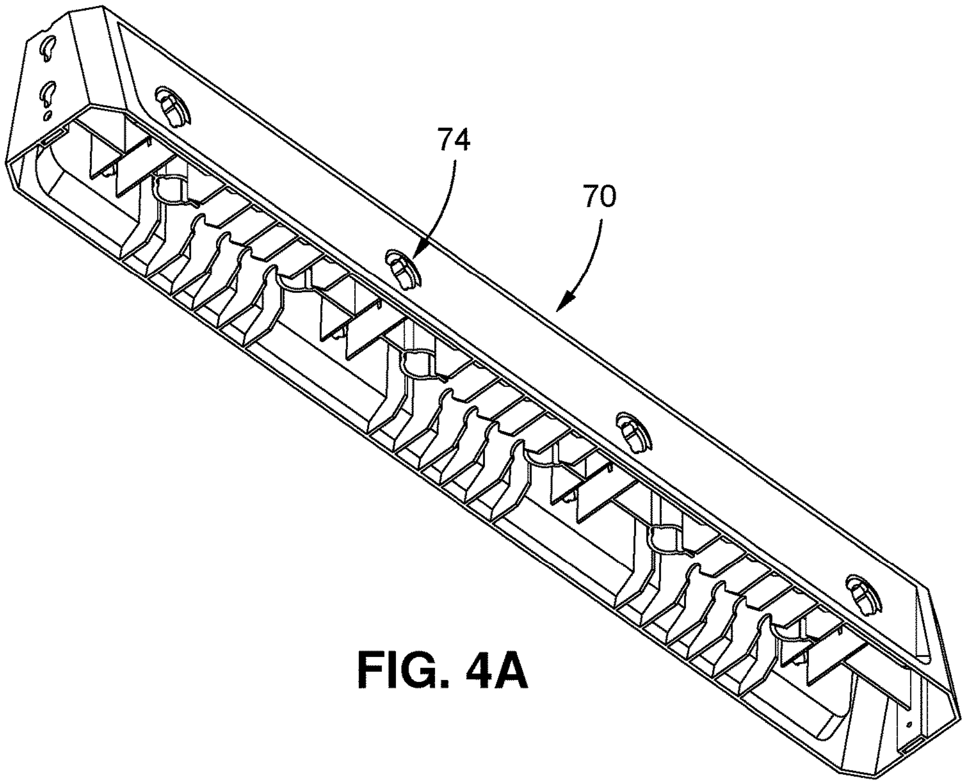
FIGS. 4A-C are perspective, top and side views of a sawhorse head in accordance with an embodiment of the invention.
Figure 4B:
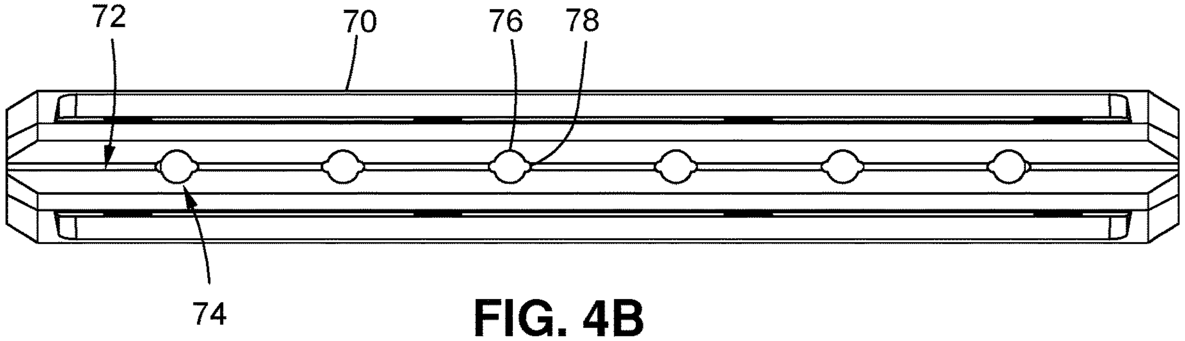
Figure 4C:
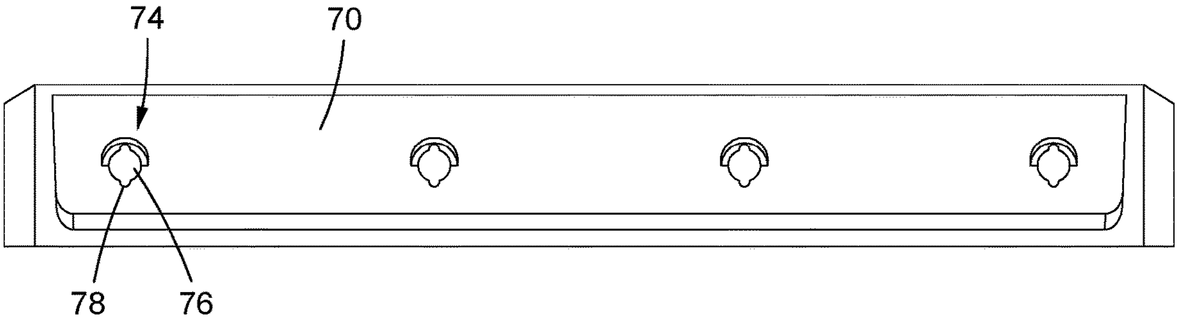

As illustrated in FIGS. 4A-C, in one embodiment, a top of the head 70 may include an elongate groove or channel 72 (along a length of the head/parallel to a length thereof), such as a V-shaped groove in which a pipe or other object may be placed (thereby extending parallel to the head).

Most preferably, the head 70 may include one or more clamp holes or apertures. The clamp holes or apertures may have various shapes. As illustrated in FIGS. 8, 9 and 11, in one embodiment, one or more clamp holes **74*a* may be shaped as a cylindrical (in cross-section) bore 76 for accepting the first or second clamp body 24,26. Where the first and second clamp bodies 24,26** have a cylindrical shape, the bores may be similarly shaped.

One or more clamp holes **74*b* may have the shape of a bore 76 with an intersecting slot 78, so as to accept both the body of the first or second clamp bodies 24,26, or the clamp bar 22. In one embodiment, the diameter of the cylindrical mounting portion of the first and second clamp bodies 24,26 is smaller than the width of the bar 22, whereby the intersecting slot must be larger than the diameter of the bore, and thus ensuring that the intersecting slot secures the clamp bar 22 (doesn't allow the bar 22** to rotate in the bore).

The clamping sawhorse 50 may include clamp holes **74*a,b* at various positions or locations. For example, one or more clamp holes 74*b* may extend generally transversely through the head 70, such as therethrough from side to side. This allows, such as illustrated in FIGS. 8-9, the bar clamp 20 to be placed through the head 70 so that the first and second clamp members 28,30 are on opposing sides of the head 70. Alternatively, the first or second clamp members 28,30 might be mounted to the head 70 via locating the corresponding first clamp body 24 or second clamp body 26 into the bore portion of the clamp hole 74*b* (without the bar 22**).

One or more clamp holes **74*a* may extend into the top of the head 70, such as vertically downward into the groove or notch 72. This allows, as illustrated in FIGS. 11 and 12A-B, the first or second clamp members 28,30 to be mounted to and extend from the top of the head 70**.

Figure 10B:
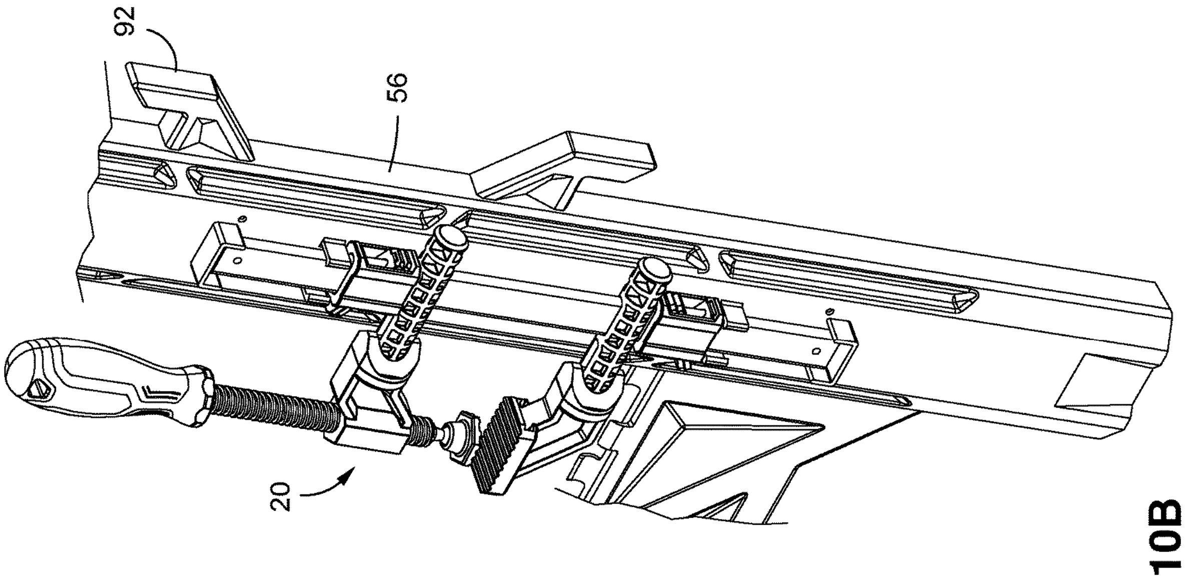
FIGS. 10A-B illustrate a connection of a hybrid clamp of the invention connected to the clamping sawhorse illustrated in FIG. 1 in a second position.
Figure 10A:
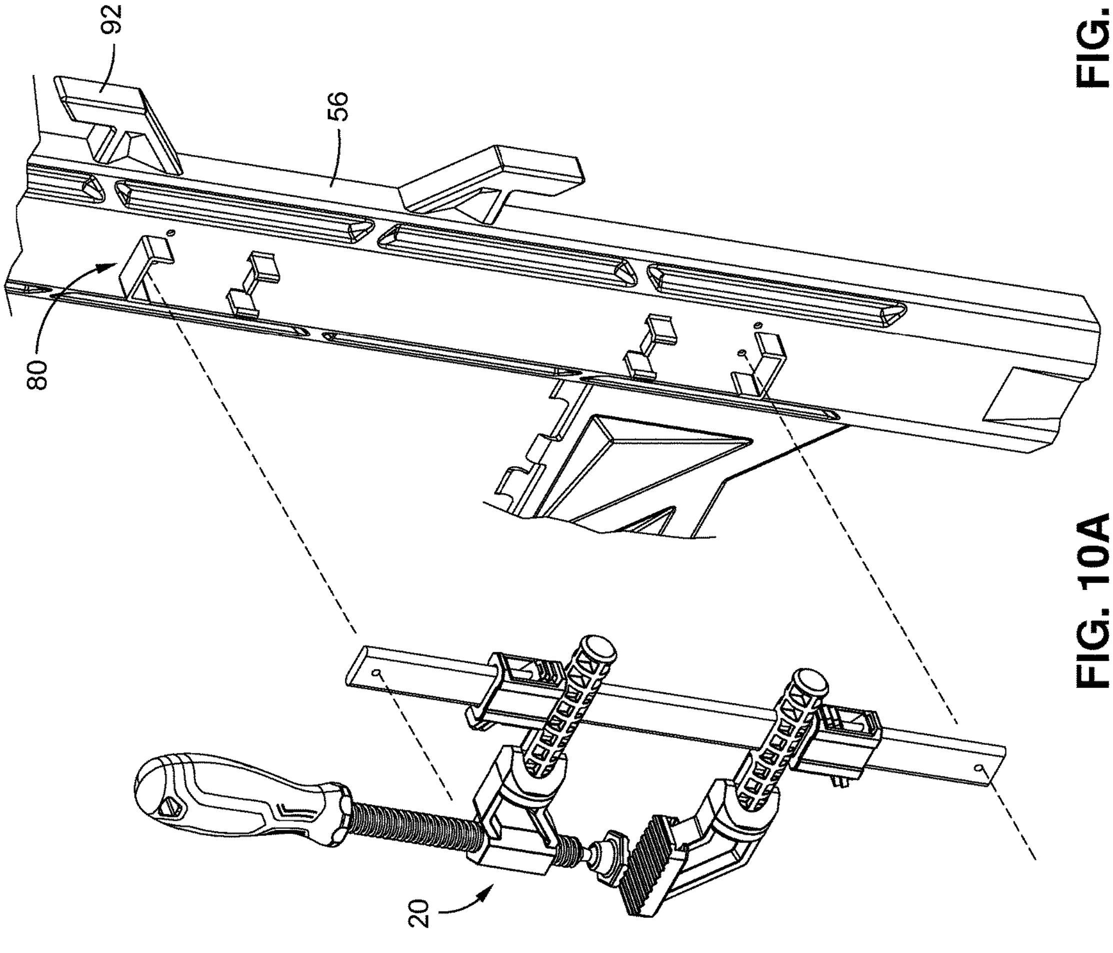

In addition, the clamping sawhorse 50 preferably includes one or more bar mounts 80 for the hybrid clamp 20. As illustrated in FIGS. 10A-B, the mounts 80 might comprise one or more clips, tabs or other elements for receiving or connecting to the clamp bar 22, such as located at the exterior of the first side 52 and/or second side 54 of the sawhorse 50. As illustrated, the mounts 80 might be configured to mount the hybrid clamp 20 in a generally vertical orientation (in which the bar 22 is generally vertically extending) relative to one of the legs 56,58,60,62.

Figure 3:
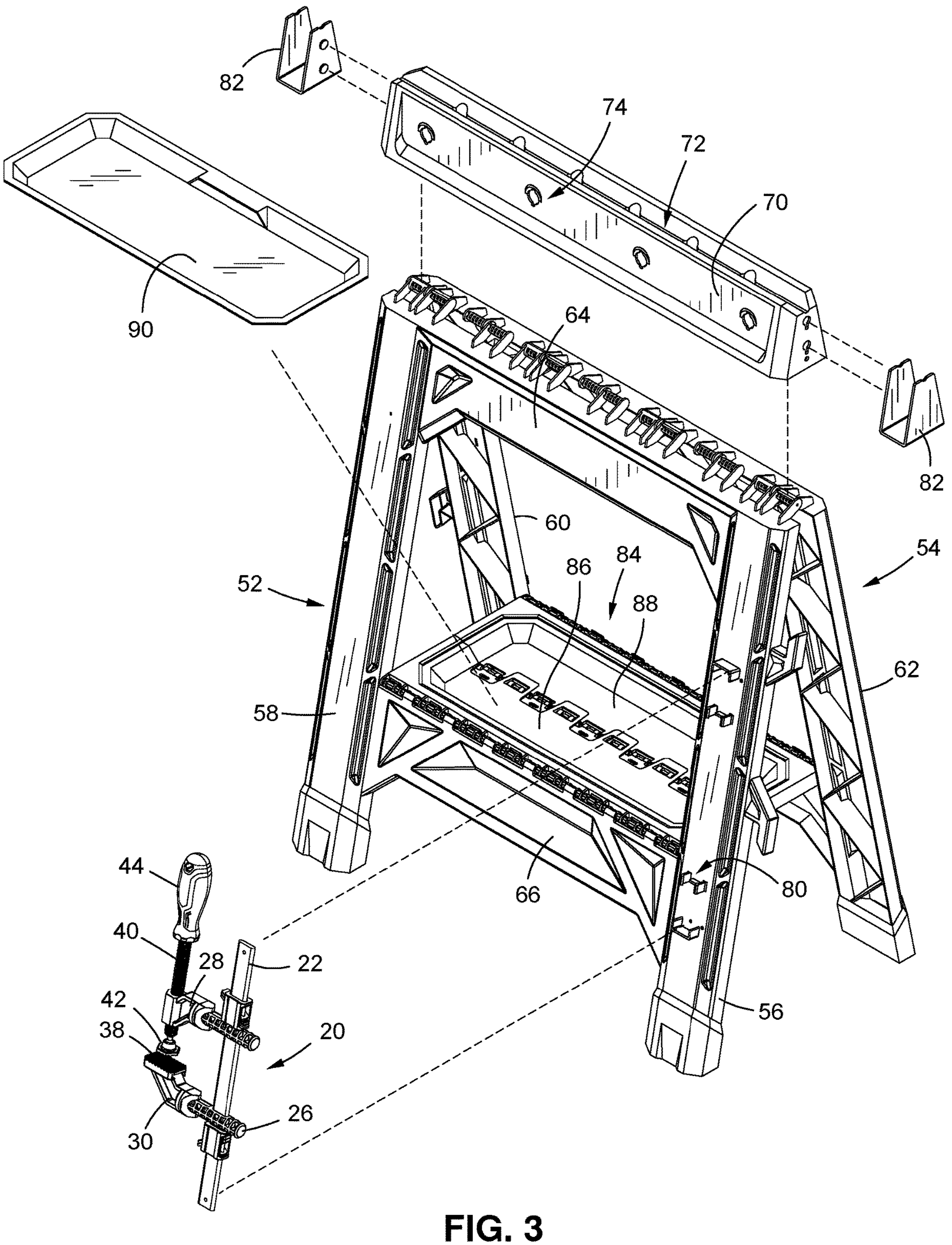
FIG. 3 is a partially exploded view of the clamping sawhorse illustrated in FIG. 1.

The clamping sawhorse 50 may include other features. For example, as illustrated in FIG. 3, a support or bracket 82 may be located at either or both ends of the head 70. The bracket 82 might comprise, for example, a generally "U" shaped bracket which is designed to support a 2×4 (whereby the width of the bracket may be 1.5-2 inches).

Figure 7:
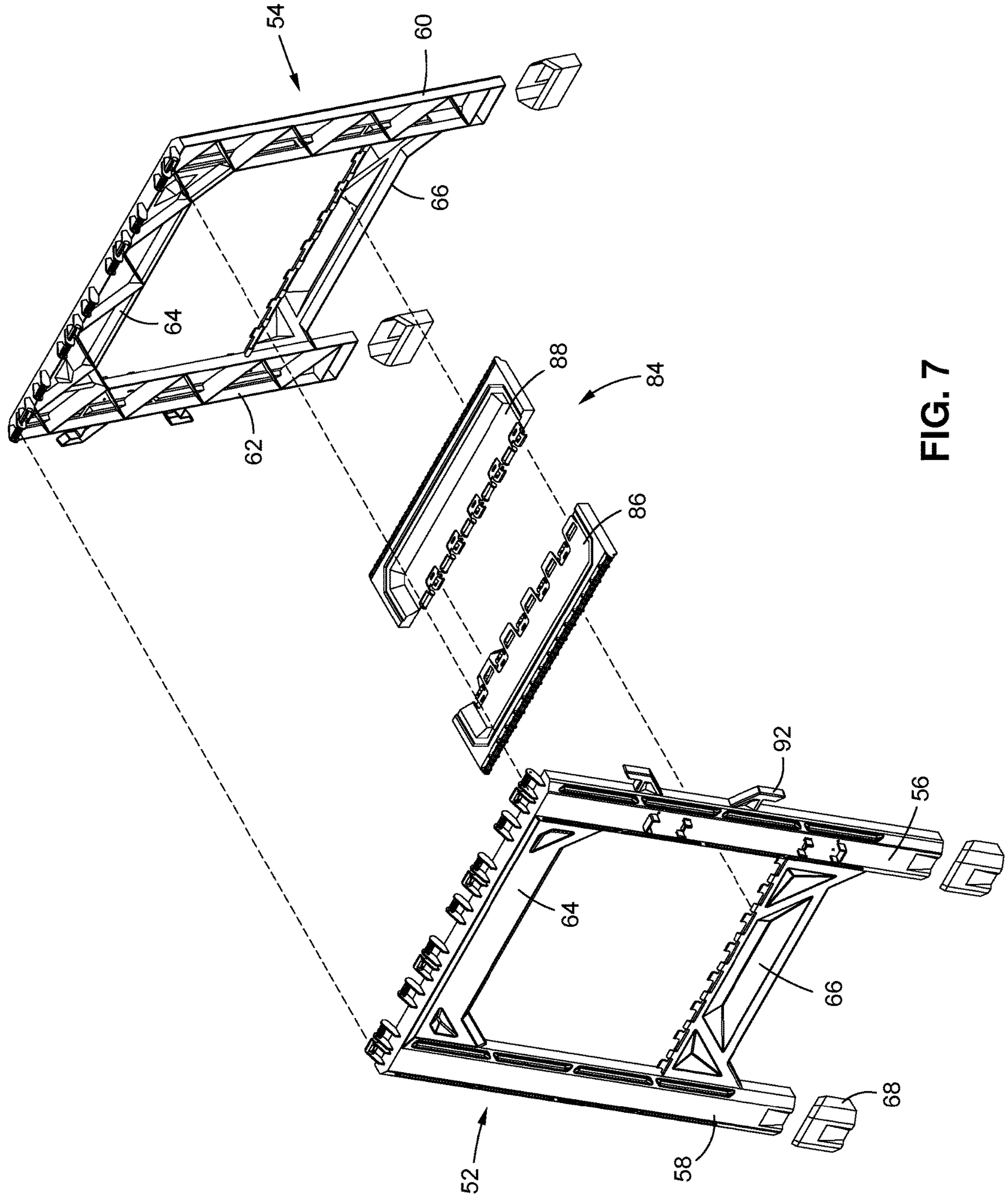
FIG. 7 is another exploded view of a portion of the clamping sawhorse illustrated in FIG. 1.

In one embodiment, as illustrated in FIG. 7, the first and second sides 52,54 of the sawhorse 50 may be connected to one another, such as by a cross-member having the form of a tray support 84. The tray support 84 may comprise a first body 86 movably mounted (such as rotatably or hingedly mounted) to the first side 52 and a second body 88 movably mounted (such as rotatably or hingedly) to the second side 54. The first and second bodies 86,88 are then preferably movably connected to one another. In one embodiment, the first body 86 has a plurality of mounting elements which connect to a plurality of mating mounting elements on the first side 52, essentially defining a hinge. The second body 88 may similarly be connected to the second side 54, as may be the first and second bodies 86,88 to one another.

In other embodiments, the first body 86 may be mounted to the first side 52 via a first elongate pin, the second body 88 may be mounted to the second side 54 via a second elongate pin, and the first and second bodies 86,88 may be mounted to one another by a third elongate pin. Of course, the first and second bodies 86,88 might be mounted in other manners, such as by hinges, ball and socket elements, etc., to allow the functionality described below.

The first and second bodies 86,88, when extended flat, may support a tray 90, as illustrated in FIG. 3. The tray 90 may be removable, such as when the sawhorse 50 is moved to its collapsed position and the first and second bodies 86,88 are folded.

The clamping sawhorse 50 might also include one or more hooks 92 for receiving a cord, such as a power cord that is wound between pairs of the hooks 92. As illustrated, at least one pair of spaced hooks 92 might be associated with one or both sides 52,54, such as extending from an end thereof. Of each pair of hooks 92, one may extend upwardly and one downwardly, allowing a user to wrap a cord around the pair of hooks 80, where the cord is trapped in a space defined between an arm portion of each hook 92 and the adjacent side 52,54.

The hybrid clamp 20 and clamping sawhorse 50 of the invention have various advantages. First, the hybrid clamp 20 can be used as a bar clamp or a dog-style clamp, where first and second clamp members 28,30 may be associated with a bar 22, or may be connected to other mounts. The clamping sawhorse 50 is design to facilitate connection of the hybrid clamp 20, or the first and/or second clamp members 28,30 (separate from the clamp bar 22). This allows a user to use the hybrid clamp 20 in various manners with the sawhorse 50, such as to secure workpieces in different locations and/or different orientations, including in association with a supporting head 70 (such as relative to workpieces which are located on the head 70) or at one or more both sides 52,54.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A hybrid clamp comprising:

a clamp bar;

a first clamp element comprising a first clamp body having a first cylindrical mounting portion, said first mounting portion having at least one first slot extending perpendicularly therethrough for receiving said clamp bar, a first clamp member connected to said first clamp body, said first clamp member comprising at least one adjustable member, and said first clamp element defining a first extension, whereby said first extension and said first mounting portion are a unitary component such that said first extension is fixed with respect to said first mounting portion;

a second clamp element comprising a second clamp body having a second cylindrical mounting portion, said second mounting portion having at least one second slot extending perpendicularly therethrough for receiving said clamp bar, a second clamp member connected to said second clamp body, said second clamp member comprising a stop, and said second clamp element defining a second extension, whereby said second extension and said second mounting portion are a unitary component such that said second extension is fixed with respect to said second mounting portion;

whereby said first and second clamp bodies are configured to be movably located on said clamp bar with said clamp bar extending through said first slot and said second slot, permitting said associated first and second clamp members to clamp an element therebetween, and whereby said first and second clamp bodies are configured to be connected to a support independently of said clamp bar by location of each of said first and second cylindrical mounting portions into a corresponding cylindrical aperture in said support, wherein said first extension of said first clamp element is engageable with a portion of said support to prevent rotation of said first clamp element with respect to said support and said second extension is engageable with a portion of said support to prevent rotation of said second clamp element with respect to said support.

2. The hybrid clamp in accordance with claim 1, wherein said clamp bar is elongate and has a rectangular cross-section.

3. The hybrid clamp in accordance with claim 1 wherein said adjustable member comprises a threaded rod.

4. The hybrid clamp in accordance with claim 3, wherein said rod has a foot at one end and a handle at an opposing end.

5. The hybrid clamp in accordance with claim 1, further comprising at least one adjustable stop locatable on said clamp bar.

6. The hybrid clamp in accordance with claim 5, wherein said adjustable stop comprises a body and a lock element movably mounted to said body, said lock element defining a third slot for accepting said clamp bar, said lock element movable between a first locked position and a second unlocked position.

7. The hybrid clamp in accordance with claim 1, wherein said first extension comprises a downwardly extending portion of said first clamp body which is located radially outward of said first cylindrical mounting portion and said second extension comprises a downwardly extending portion of said second clamp body which is located radially outward of said second cylindrical mount portion.

8. The hybrid clamp in accordance with claim 1, whereby said first extension is disposed between said at least one adjustable member and said first mounting portion, and whereby said second extension is disposed between said stop and said second mounting portion.

9. The hybrid clamp in accordance with claim 1, whereby said at least one first slot of said first mounting portion is provided through a wall of said first mounting portion.

10. The hybrid clamp in accordance with claim 1, wherein the first cylindrical mounting portion has a first exterior surface, wherein said first extension is located outwardly of said first exterior surface, wherein the second cylindrical mounting portion has a second exterior surface, and wherein said second extension is located outwardly of said second exterior surface.

11. A hybrid clamp comprising:

a clamp bar;

a first clamp element comprising a first clamp body having a first cylindrical mounting portion, said first mounting portion having at least one first slot for receiving said clamp bar, a first clamp member connected to said first clamp body, said first clamp member comprising at least one adjustable member, and said first clamp element defining a first extension, whereby said first extension and said first mounting portion are a unitary component such that said first extension is fixed with respect to said first mounting portion;

a second clamp element comprising a second clamp body having a second cylindrical mounting portion, said second mounting portion having at least one second slot for receiving said clamp bar, a second clamp member connected to said second clamp body, said second clamp member comprising a first stop, and said second clamp element defining a second extension, whereby said second extension and said second mounting portion are a unitary component such that said second extension is fixed with respect to said second mounting portion;

a second stop and a third stop each located on the clamp bar in order to limit movement of the first and second clamp bodies away from one another, wherein the clamp bar has a first end and a second end disposed opposite the first end, wherein the second stop is disposed between the first end and the first clamp body, and wherein the third stop is disposed between the second end and the second clamp body;

whereby said first and second clamp bodies are configured to be movably located on said clamp bar with said clamp bar extending through said first slot and said second slot, permitting said associated first and second clamp members to clamp an element therebetween, and whereby said first and second clamp bodies are configured to be connected to a support independently of said clamp bar by location of each of said first and second cylindrical mounting portions into a corresponding cylindrical mating aperture in said support, wherein said first extension of said first clamp element is engageable with a portion of said support to prevent rotation of said first clamp element with respect to said support and said second extension is engageable with a portion of said support to prevent rotation of said second clamp element with respect to said support.

12. The hybrid clamp according to claim 11, whereby said first and second mounting portions allow said first and second clamp bodies to be mounted to the support by location in said corresponding bore, when said first and second clamp bodies are removed from said clamp bar.

13. The hybrid clamp according to claim 11, wherein the second and third stops each comprise a housing that is configured to support a movable lock for binding to the clamp bar.

14. The hybrid clamp in accordance with claim 10, wherein said first extension comprises a first V-shaped extension and a second V-shaped extension each located generally 180 degrees from one another at said top of said first extension, and wherein said second extension comprises a third V-shaped extension and a fourth V-shaped extension each located generally 180 degrees from one another at said top of said second extension.

* * * * *